United States Patent
Kokubo

(10) Patent No.: US 11,789,580 B2
(45) Date of Patent: Oct. 17, 2023

(54) INFORMATION PROCESSING APPARATUS, NON-TRANSITORY COMPUTER READABLE MEDIUM STORING PROGRAM, AND METHOD

(71) Applicant: FUJIFILM Business Innovation Corp., Tokyo (JP)

(72) Inventor: Taiga Kokubo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/378,754

(22) Filed: Jul. 18, 2021

(65) Prior Publication Data

US 2022/0232136 A1 Jul. 21, 2022

(30) Foreign Application Priority Data

Jan. 20, 2021 (JP) ................... 2021-007200

(51) Int. Cl.
*G06F 3/0481* (2022.01)
*H04N 1/00* (2006.01)

(52) U.S. Cl.
CPC ....... *G06F 3/0481* (2013.01); *H04N 1/00395* (2013.01); *H04N 1/00506* (2013.01); *H04N 1/00517* (2013.01)

(58) Field of Classification Search
None
See application file for complete search history.

(56) References Cited

U.S. PATENT DOCUMENTS

| | | | |
|---|---|---|---|
| 7,237,240 B1* | 6/2007 | Chen | G06F 11/3438 707/999.001 |
| 7,493,567 B2 | 2/2009 | Ollis et al. | |
| 8,402,375 B1* | 3/2013 | Skare | G06F 16/9562 714/763 |
| 8,713,124 B1* | 4/2014 | Weiss | G06Q 10/107 715/752 |
| 9,247,084 B2* | 1/2016 | Yamamoto | H04N 1/00514 |
| 10,432,804 B2 | 10/2019 | Akuzawa | |
| 10,656,784 B2* | 5/2020 | Jin | G06F 3/0482 |
| 2003/0149675 A1* | 8/2003 | Ansari | H04N 21/443 706/2 |
| 2004/0036779 A1* | 2/2004 | Cazier | H04N 23/631 386/E5.072 |
| 2004/0150674 A1* | 8/2004 | Takahashi | B60K 35/00 715/810 |
| 2005/0166157 A1* | 7/2005 | Ollis | G06F 3/0482 715/764 |
| 2005/0182798 A1* | 8/2005 | Todd | G06F 3/0482 |

(Continued)

FOREIGN PATENT DOCUMENTS

| | | |
|---|---|---|
| JP | 2005222541 | 8/2005 |
| JP | 4979891 | 7/2012 |
| JP | 2018125686 | 8/2018 |

*Primary Examiner* — Tuyetlien T Tran
(74) *Attorney, Agent, or Firm* — JCIPRNET

(57) ABSTRACT

An information processing apparatus includes a processor configured to grasp usage histories of plural pieces of data stored in a storage apparatus, and in a case of initially displaying information related to the plural pieces of data on a screen, perform control to display information related to specific data of which a usage history satisfies a predetermined condition at a predetermined position on the screen.

14 Claims, 11 Drawing Sheets

520

| FILE ID | FILE NAME | ... | PINNING FLAG | PINNING DATE | TEMPORARY RELEASE FLAG |
|---|---|---|---|---|---|
| F0001 | APPLICATION B | ... | OFF | | OFF |
| F0002 | INVOICE B | ... | OFF | | OFF |
| F0003 | INVOICE A | ... | ON | 09.25.2019 | OFF |
| F0004 | MEMO | ... | OFF | | OFF |
| F0005 | APPLICATION A | ... | OFF | | OFF |
| ⋮ | ⋮ | ⋮ | ⋮ | ⋮ | ⋮ |

(56) References Cited

U.S. PATENT DOCUMENTS

| | | | | |
|---|---|---|---|---|
| 2005/0210478 | A1* | 9/2005 | Blaisdell | H04L 41/0622 719/318 |
| 2006/0218500 | A1* | 9/2006 | Sauve | G06F 3/0483 715/767 |
| 2006/0218502 | A1* | 9/2006 | Matthews | G06F 3/0482 715/779 |
| 2006/0218503 | A1* | 9/2006 | Matthews | G06F 3/0482 715/779 |
| 2007/0180108 | A1* | 8/2007 | Newman | G06Q 10/06 709/224 |
| 2008/0155428 | A1* | 6/2008 | Lee | G06F 3/0482 715/745 |
| 2009/0199122 | A1* | 8/2009 | Deutsch | G06F 9/445 715/771 |
| 2009/0222767 | A1* | 9/2009 | Matthews | G06F 3/0482 715/835 |
| 2009/0282061 | A1* | 11/2009 | Ha | H04N 1/00384 |
| 2010/0031189 | A1* | 2/2010 | Groezinger | G06F 3/038 715/804 |
| 2010/0162168 | A1* | 6/2010 | Lee | G06F 16/9562 715/810 |
| 2010/0312600 | A1* | 12/2010 | Motoyama | G06Q 30/0206 358/1.15 |
| 2011/0191687 | A1* | 8/2011 | Takeda | G06F 15/177 715/736 |
| 2011/0296349 | A1* | 12/2011 | Todd | H04M 1/2746 715/822 |
| 2011/0302165 | A1* | 12/2011 | Ishii | G06Q 30/0282 707/E17.089 |
| 2012/0140255 | A1* | 6/2012 | Tanaka | G06F 9/445 358/1.13 |
| 2012/0166956 | A1* | 6/2012 | Hilerio | G06F 9/44505 715/734 |
| 2012/0166959 | A1* | 6/2012 | Hilerio | G06Q 10/00 715/738 |
| 2013/0024815 | A1* | 1/2013 | O | H04M 1/72472 715/811 |
| 2013/0067338 | A1* | 3/2013 | Kern | G06F 16/954 715/738 |
| 2013/0191339 | A1* | 7/2013 | Haden | G06F 16/178 707/827 |
| 2014/0222922 | A1* | 8/2014 | Ogawa | H04L 67/535 709/204 |
| 2016/0092520 | A1* | 3/2016 | Srivastava | G06F 16/9537 707/722 |
| 2016/0252944 | A1* | 9/2016 | Kim | H04W 52/0264 713/340 |
| 2018/0220015 | A1* | 8/2018 | Akuzawa | H04N 1/21 |
| 2020/0159862 | A1* | 5/2020 | Kleiner | G06F 16/248 |
| 2021/0286647 | A1* | 9/2021 | Neginhal | G06F 9/4881 |

* cited by examiner

| FILE ID | FILE NAME | NUMBER OF TIMES OF USE | ... |
|---|---|---|---|
| F0001 | APPLICATION B | 2 | ... |
| F0002 | INVOICE B | 1 | ... |
| F0003 | INVOICE A | 10 | ... |
| F0004 | MEMO | 2 | ... |
| F0005 | APPLICATION A | 1 | ... |
| ⋮ | ⋮ | ⋮ | ⋮ |

| FILE ID | FILE NAME | ... | PINNING FLAG |
|---|---|---|---|
| F0001 | APPLICATION B | ... | OFF |
| F0002 | INVOICE B | ... | OFF |
| F0003 | INVOICE A | ... | ON |
| F0004 | MEMO | ... | OFF |
| F0005 | APPLICATION A | ... | OFF |
| ⋮ | ⋮ | ⋮ | ⋮ |

| DATE OF USE | FILE ID | FILE NAME | ... |
|---|---|---|---|
| ⋮ | ⋮ | ⋮ | ⋮ |
| 06.25.2019 | F0003 | INVOICE A | ... |
| ⋮ | ⋮ | ⋮ | ⋮ |
| 07.28.2019 | F0003 | INVOICE A | ... |
| ⋮ | ⋮ | ⋮ | ⋮ |
| 08.26.2019 | F0003 | INVOICE A | ... |
| ⋮ | ⋮ | ⋮ | ⋮ |
| 09.25.2019 | F0003 | INVOICE A | ... |
| ⋮ | ⋮ | ⋮ | ⋮ |

FIG. 8

| FILE ID | FILE NAME | ... | PINNING FLAG | PINNING DATE | TEMPORARY RELEASE FLAG |
|---|---|---|---|---|---|
| F0001 | APPLICATION B | ... | OFF | | OFF |
| F0002 | INVOICE B | ... | OFF | | OFF |
| F0003 | INVOICE A | ... | ON | 09.25.2019 | OFF |
| F0004 | MEMO | ... | OFF | | OFF |
| F0005 | APPLICATION A | ... | OFF | | OFF |
| ... | ... | ... | ... | ... | ... |

FIG. 10

| DATE OF USE | FILE ID | FILE NAME | FILE TYPE ID | ... |
|---|---|---|---|---|
| ⋮ | ⋮ | ⋮ | ⋮ | ⋮ |
| 06.25.2019 | F0003 | INVOICE A | T0002 | ... |
| 06.26.2019 | F0002 | INVOICE B | T0002 | ... |
| ⋮ | ⋮ | ⋮ | ⋮ | ⋮ |
| 07.27.2019 | F0002 | INVOICE B | T0002 | ... |
| 07.28.2019 | F0003 | INVOICE A | T0002 | ... |
| ⋮ | ⋮ | ⋮ | ⋮ | ⋮ |
| 08.25.2019 | F0002 | INVOICE B | T0002 | ... |
| 08.26.2019 | F0003 | INVOICE A | T0002 | ... |
| ⋮ | ⋮ | ⋮ | ⋮ | ⋮ |
| 09.25.2019 | F0003 | INVOICE A | T0002 | ... |
| 09.26.2019 | F0002 | INVOICE B | T0002 | ... |
| ⋮ | ⋮ | ⋮ | ⋮ | ⋮ |

| FILE ID | FILE NAME | FILE TYPE ID | ... | PINNING FLAG | PINNING DATE | TEMPORARY RELEASE FLAG |
|---|---|---|---|---|---|---|
| F0001 | APPLICATION B | T0001 | ... | OFF | | OFF |
| F0002 | INVOICE B | T0002 | ... | ON | 09.26.2019 | OFF |
| F0003 | INVOICE A | T0002 | ... | ON | 09.26.2019 | OFF |
| F0004 | MEMO | T0003 | ... | OFF | | OFF |
| F0005 | APPLICATION A | T0001 | ... | OFF | | OFF |
| ... | ... | ... | ... | ... | ... | ... |

INFORMATION PROCESSING APPARATUS, NON-TRANSITORY COMPUTER READABLE MEDIUM STORING PROGRAM, AND METHOD

CROSS-REFERENCE TO RELATED APPLICATIONS

This application is based on and claims priority under 35 USC 119 from Japanese Patent Application No. 2021-007200 filed Jan. 20, 2021.

BACKGROUND

(i) Technical Field

The present invention relates to an information processing apparatus, a non-transitory computer readable medium storing a program, and method.

(ii) Related Art

JP2005-222541A discloses a method of pinning an item selected by a user and displaying the pinned item so that the pinned item is distinguished from a related unpinned item and has a higher priority than the related unpinned item.

In JP2018-125686A, an image processing apparatus is disclosed in which it is possible to prevent a setting history from being displayed in an integrated history by setting pinning for a setting history that a user often calls from setting histories, and it is possible to easily find the setting history from the integrated history by displaying the setting history that has been set to be pinned above other setting histories.

SUMMARY

In a case of displaying information related to a plurality of pieces of data stored in a storage apparatus on a screen, for example, in a case where the pieces of data are displayed in an order in which the pieces of data are stored and in an order of names of the pieces of data, it becomes difficult to find information related to specific data of which a usage history satisfies a predetermined condition from the information related to the plurality of pieces of data.

Aspects of non-limiting embodiments of the present disclosure relate to an information processing apparatus and a non-transitory computer readable medium storing a program that makes it easy, in a case of displaying information related to a plurality of pieces of data stored in a storage apparatus on a screen, to find information related to specific data of which a usage history satisfies a predetermined condition from the information related to the plurality of pieces of data, for example, as compared with a case where the pieces of data are displayed in an order in which the pieces of data are stored and an order of names of the pieces of data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to grasp usage histories of a plurality of pieces of data stored in a storage apparatus, and in a case of initially displaying information related to the plurality of pieces of data on a screen, perform control to display information related to specific data of which the usage history satisfies a predetermined condition at a predetermined position on the screen.

BRIEF DESCRIPTION OF THE DRAWINGS

Exemplary embodiment(s) of the present invention will be described in detail based on the following figures, wherein:

FIG. 4 is a diagram showing an example of usage histories after being updated by a first operation of the information processing apparatus according to an exemplary embodiment of the present invention;

FIG. 5 is a diagram showing an example of pinning information after being updated by a first operation of the information processing apparatus according to an exemplary embodiment of the present invention;

FIG. 7 is a diagram showing an example of usage histories after being updated by a second operation of the information processing apparatus according to an exemplary embodiment of the present invention;

FIG. 8 is a diagram showing an example of pinning information after being updated by a second operation of the information processing apparatus according to an exemplary embodiment of the present invention;

FIG. 10 is a diagram showing an example of usage histories after being updated by a third operation of the information processing apparatus according to an exemplary embodiment of the present invention;

FIG. 11 is a diagram showing an example of pinning information after being updated by a third operation of the information processing apparatus according to an exemplary embodiment of the present invention.

DETAILED DESCRIPTION

Figure 1:
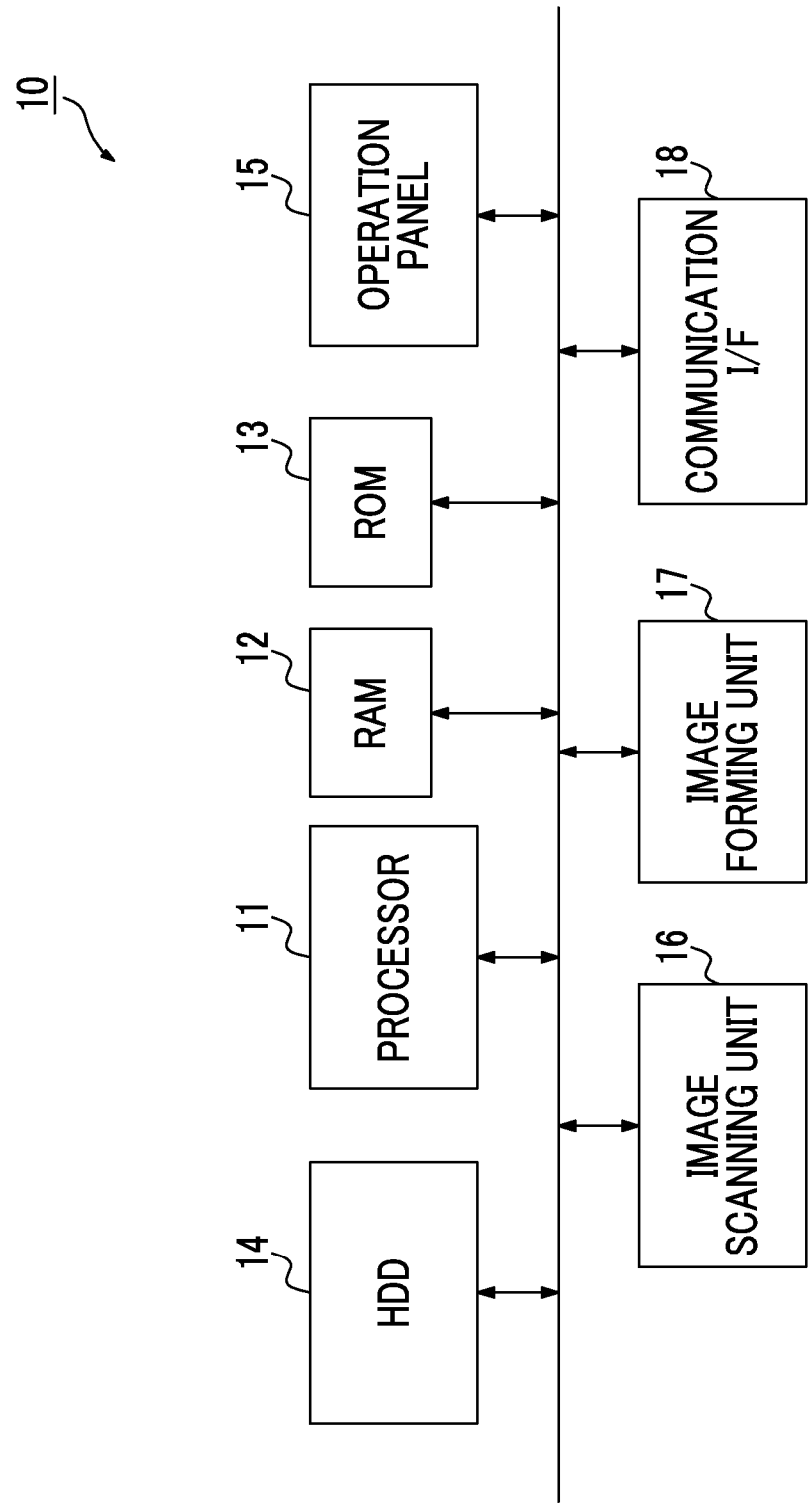
FIG. 1 is a diagram showing a hardware configuration example of an image processing apparatus according to an exemplary embodiment of the present invention.

Hereinafter, an exemplary embodiment of the present invention will be described in detail with reference to the drawings.

Outline of Present Exemplary Embodiment

The present exemplary embodiment provides an information processing apparatus that grasps usage histories of a plurality of pieces of data stored in a storage apparatus, and displays, in a case of initially displaying information related to the plurality of pieces of data on a screen, information related to specific data of which a usage history satisfies a predetermined condition at a predetermined position on the screen.

In a first mode of the information processing apparatus, the usage history may be the number of times of use in a predetermined period, and the predetermined condition may be a condition that the number of times of use in the predetermined period exceeds a reference number of times. Hereinafter, an operation of the first mode of the information processing apparatus will be referred to as a "first operation".

In a second mode of the information processing apparatus, the usage history may be the number of times of use in each of periods that appear repeatedly, and the predetermined condition may be a condition that the number of periods during which the number of times of use is equal to or more than a reference number of times among the periods that appear repeatedly exceeds the number of reference periods. Hereinafter, an operation of the second mode of the information processing apparatus will be referred to as a "second operation".

In a third mode of the information processing apparatus, the usage history for each type of the plurality of pieces of data stored in the storage apparatus may be grasped, and in a case of initially displaying information related to the plurality of pieces of data on the screen, the information related to data of a specific type of which a usage history satisfies a predetermined condition may be displayed at a predetermined position on the screen.

Further, in the third mode of the information processing apparatus, as in the first mode of the information processing apparatus, the usage history may be the number of times of use in a predetermined period, and the predetermined condition may be a condition that the number of times of use in the predetermined period exceeds a reference number of times. Alternatively, as in the second mode of the information processing apparatus, the usage history may be the number of times of use in each of the periods that appear repeatedly, and the predetermined condition may be a condition that the number of periods during which the number of times of use is equal to or more than the reference number of times among the periods that appear repeatedly exceeds the number of reference periods. However, in the following, the latter will be described as an example. Further, hereinafter, the operation of the third mode of the information processing apparatus will be referred to as a "third operation".

Here, the information processing apparatus may be applied to any apparatus such as an image processing apparatus and a personal computer, but a case where an information processing apparatus is applied to an image processing apparatus will be described below as an example.

In addition, the data may or may not be organized in a file format. In the following, a file will be described as an example of data.

Further, the information related to the data may be any information as long as the information is related to the data. For example, the information related to the data includes information such as the name, size, and creation date and time of the data.

Furthermore, the predetermined position where the information related to the specific data is displayed means a predetermined position in a case where the information related to the plurality of pieces of data is first displayed on the screen. Therefore, the predetermined position may be moved by scrolling the screen by a subsequent user operation. The predetermined position may be any position such as a top of the file list, a bottom of the file list, and the left and right of the file list, but in the following, the position at the top of the file list will be described as an example. In the following, displaying at the top of the file list will be referred to as "pinning".

Hardware Configuration of Image Processing Apparatus

FIG. 1 is a diagram showing a hardware configuration example of an image processing apparatus 10 according to the present exemplary embodiment. As shown in the drawing, the image processing apparatus 10 includes a processor 11, a random access memory (RAM) 12, a read only memory (ROM) 13, a hard disk drive (HDD) 14, an operation panel 15, an image scanning unit 16, an image forming unit 17, and a communication interface (hereinafter, referred to as "communication I/F") 18.

The processor 11 realizes each function described later by loading and executing various programs stored in the ROM 13 or the like into the RAM 12.

The RAM 12 is a memory used as a working memory or the like of the processor 11. The ROM 13 is a memory for storing various programs or the like executed by the processor 11.

The HDD 14 is, for example, a magnetic disk apparatus that stores image data read by the image scanning unit 16, image data used in image formation in the image forming unit 17, or the like. In the present exemplary embodiment, it is assumed that the HDD 14 is used as a box such as a confidential box for storing a file. Here, the file may be a document file created using software, an image file scanned by the image scanning unit 16 or received by the communication I/F 18, a document file obtained by documenting this image file, or the like.

The operation panel 15 is, for example, a touch panel that displays various items of information and receives operation input from the user. Here, the operation panel 15 consists of a display on which various items of information are displayed and a position detection sheet that detects a position instructed by pointing means such as a finger and a stylus pen. Alternatively, a display and a keyboard may be used instead of the touch panel.

The image scanning unit 16 scans an image recorded on a recording medium such as paper. Here, the image scanning unit 16 is, for example, a scanner, and may be one that employs a CCD method in which reflected light with respect to the light emitted from a light source to a document is reduced by a lens and received by charge coupled devices (CCDs), or a CIS method in which reflected light with respect to the light emitted from an LED light source to the document is received by using a contact image sensor (CIS) in order.

The image forming unit 17 forms an image on a recording medium such as paper. Here, the image forming unit 17 is, for example, a printer, and may be one that employs an electrophotographic method that forms an image by transferring toner attached to a photoconductor to a recording medium or an ink jet method that ejects ink onto a recording medium to form an image.

The communication I/F 18 transmits and receives various items of information to and from other apparatuses via a communication line.

Functional Configuration of Information Processing Apparatus

Figure 2:
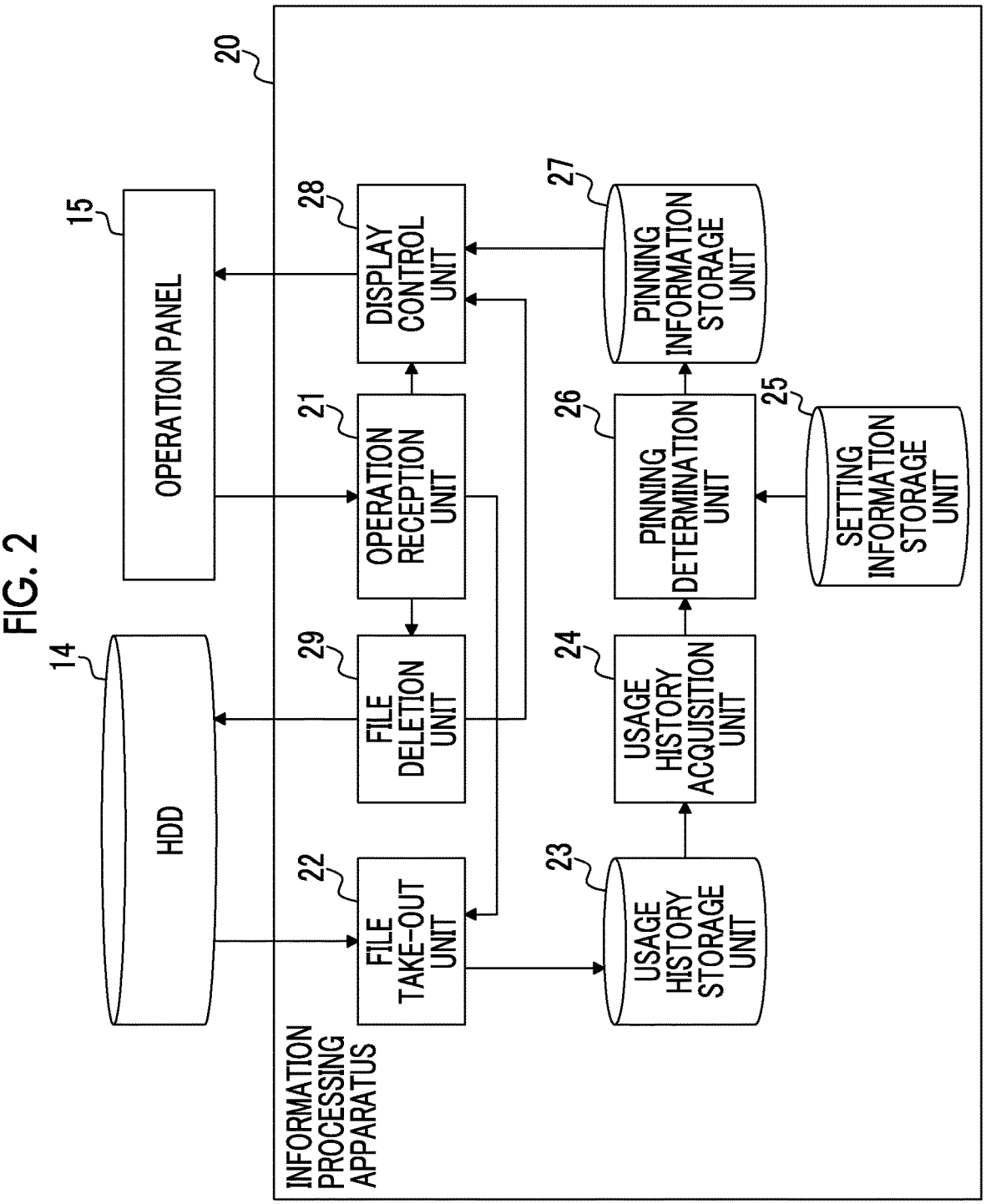
FIG. 2 is a block diagram showing a functional configuration example of the information processing apparatus according to an exemplary embodiment of the present invention.

FIG. 2 is a block diagram showing a functional configuration example of an information processing apparatus 20 according to the present exemplary embodiment. Here, the information processing apparatus 20 may be regarded as an apparatus realized by the processor 11 (refer to FIG. 1) of the image processing apparatus 10 reading a program for realizing each functional unit described later from the ROM 13 (refer to FIG. 1) into the RAM 12 (refer to FIG. 1) and executing the program. As shown in the drawing, the information processing apparatus 20 includes an operation reception unit 21, a file take-out unit 22, a usage history storage unit 23, a usage history acquisition unit 24, a setting information storage unit 25, a pinning determination unit 26, a pinning information storage unit 27, a display control unit 28, and a file deletion unit 29.

The operation reception unit 21 receives a user operation on the operation panel 15. The user operation includes an operation of taking out a file stored in the box of the HDD 14, an operation of requesting display of a list of the files stored in the box of the HDD 14, an operation of deleting a file stored in the box of the HDD 14, and the like.

In a case where the operation reception unit 21 receives a user operation of selecting and taking out a file from the box of the HDD 14, the file take-out unit 22 takes out the selected file from the HDD 14. The file take-out unit 22 is assumed to take out a file for printing or transmission to another apparatus, for example, but the file may be taken out for any processing. Further, the file take-out unit 22 stores the history that the file has been taken out, that is, the usage history that is the history that the file has been used, in the usage history storage unit 23.

In a case where the information processing apparatus 20 performs a first operation or a second operation, the usage history storage unit 23 stores the usage history of each file of a plurality of files. Here, the usage history may be the number of times each file has been used, or may be the date of use of each file. The details of the usage history in this case will be described later.

In a case where the information processing apparatus 20 performs a third operation, the usage history storage unit 23 stores a usage history of a file of each file type of a plurality of file types. Here, the usage history may be the number of times the file of each file type has been used, or may be the date of use of the file of each file type. The details of the usage history in this case will also be described later.

In a case where the information processing apparatus 20 performs a first operation or a second operation, the usage history acquisition unit 24 acquires the usage history of each file of a plurality of files from the usage history storage unit 23. In the present exemplary embodiment, the processing of the usage history acquisition unit 24 is performed as an example of grasping the usage history of a plurality of pieces of data stored in the storage apparatus.

In a case where the information processing apparatus 20 performs a third operation, the usage history acquisition unit 24 acquires the usage history of a file of each file type of a plurality of file types from the usage history storage unit 23. In the present exemplary embodiment, the processing of the usage history acquisition unit 24 is performed as an example of grasping the usage history for each type of a plurality of pieces of data stored in the storage apparatus.

The setting information storage unit 25 stores setting information referred to in a case where the pinning determination unit 26 determines whether to pin each file.

The setting information includes a reference number of times in a case where the information processing apparatus 20 performs a first operation. In this case, the reference number of times is the number of times the file has been used within a predetermined period, which is required to pin the file.

The setting information includes a pinning period, the reference number of times, and the number of reference periods in a case where the information processing apparatus 20 performs a second operation or a third operation. The pinning period is a period during which the file is pinned. It is assumed that the pinning period appears repeatedly, for example, on a fixed day of each month or a fixed day of the week. In a case where the information processing apparatus 20 performs the second operation, the reference number of times is the number of times the file has been used within the pinning period, which is required to pin the file, and in a case where the information processing apparatus 20 performs the third operation, the reference number of times is the number of times the file type of the file has been used within the pinning period, which is required to pin the file. In a case where the information processing apparatus 20 performs the second operation, the number of reference periods is the number of pinning periods which is required to pin a file, in which the number of times the file has been used within the pinning period is equal to or more than the reference number of times, and in a case where the information processing apparatus 20 performs the third operation, the number of reference periods is the number of pinning periods, which is required to pin a file, in which the number of times the file type of the file has been used within the pinning period is equal to or more than the reference number of times.

Further, the setting information storage unit 25 may store a uniform pinning period, the reference number of times, and the number of reference periods regardless of the file or file type, but may store different pinning periods, the reference numbers of times, and the numbers of reference periods for each file or file type.

Further, the setting information may include a type of processing in which the file to be pinned is stored in the HDD 14, identification information of the file to be pinned, the date and time to be pinned, the purpose of use of the file to be pinned, and the like.

In a case where the information processing apparatus 20 performs a first operation or a second operation, the pinning determination unit 26 determines that the file of which a usage history of the file acquired by the usage history acquisition unit 24 satisfies a predetermined condition is to be pinned, and stores information for fixing and displaying the file at the top of the list in the pinning information storage unit 27. In the present exemplary embodiment, a file list is used as an example of information related to the plurality of pieces of data, and a file of which a usage history satisfies a predetermined condition is used as an example of specific data of which a usage history satisfies a predetermined condition. Further, in the present exemplary embodiment, in a case of initially displaying the information related to the plurality of pieces of data on the screen, the processing of the pinning determination unit 26 is performed as an example of controlling to display the information related to the specific data at a predetermined position on the screen.

Specifically, in a case where the information processing apparatus 20 performs the first operation, the pinning determination unit 26 determines that, in a case where the number of times the file has been used within the predetermined period exceeds the reference number of times, the file is pinned. Here, the pinning determination unit 26 may pin the file, and then pin and display the file only within the pinning period.

Further, in a case where the information processing apparatus 20 performs the second operation, the pinning determination unit 26 determines that, in a case where the number of pinning periods during which the number of times the file has been used is equal to or more than the reference number of times exceeds the number of reference periods, the file is pinned. Here, the pinning determination unit 26 may pin the file, and then pin and display the file only within the pinning period. In the present exemplary embodiment, the pinning period after pinning is used as an example of a specific period among the periods that appear repeatedly. Further, in the present exemplary embodiment, in a case where the number of periods during which the number of times of use is equal to or more than the reference number of times among the periods that appear repeatedly exceeds the number of reference periods, the processing of the pinning determination unit 26 is performed as an example of controlling to display the information related to the specific data at a predetermined position in the specific period.

In a case where the information processing apparatus 20 performs the third operation, the pinning determination unit 26 determines that the file of the file type of which the usage history of the file type acquired by the usage history acquisition unit 24 satisfies the predetermined condition is pinned, and stores information for fixing and displaying the file at the top of the list in the pinning information storage unit 27. In the present exemplary embodiment, a file list is used as an example of information related to a plurality of pieces of data, and a file of a file type of which a usage history satisfies the predetermined condition is used as an example of data of the specific type of which a usage history satisfies a predetermined condition. Further, in the present exemplary embodiment, in a case where the information related to a plurality of pieces of data is initially displayed on the screen, the processing of the pinning determination unit 26 is performed as an example of controlling to display the information related to the data of the specific type at a predetermined position on the screen.

Specifically, in this case, the pinning determination unit 26 determines that, in a case where the number of pinning periods during which the number of times the file has been used is equal to or more than the reference number of times exceeds the number of reference periods, the file is pinned. Here, the pinning determination unit 26 may pin the file, and then pin and display the file only within the pinning period. In the present exemplary embodiment, the pinning period after pinning is performed is used as an example of a specific period among the periods that appear repeatedly. Further, in the present exemplary embodiment, in a case where the number of periods during which the number of times of use is equal to or more than the reference number of times among the periods that appear repeatedly exceeds the number of reference periods, the processing of the pinning determination unit 26 is performed as an example of controlling to display the information related to the data of the specific type at a predetermined position in a specific period.

Further, the pinning determination unit 26 may pin the file and then release the pinned and displayed state of the file. The following three conditions may be considered as conditions for releasing the state.

The first condition is that the user has instructed. In this case, the pinning determination unit 26 releases the pinned and displayed state in a case where the release is instructed by the user.

The second condition is that, after pinning a file, the file has been used a predetermined number of times during the next and subsequent pinning periods. It is assumed that the file has been pinned by being used a predetermined number of times within the pinning period. For example, it is a case where the file has been pinned by being used once at the end of the month or twice at the end of the month. In this case, for example, the pinning determination unit 26 may release the pinned and displayed state in a case where the file is used the number of times during the next and subsequent pinning periods. This is an example of releasing the state of controlling to display information related to the specific data at a predetermined position in a specific period in a case where the number of times of use in a specific period is equal to or more than the reference number of times.

The third condition is that, after pinning the file, the pinning period has ended. It is assumed that the file has been pinned by being used a predetermined number of times within the pinning period. For example, it is a case where the file has been pinned by being used once at the end of the month or twice at the end of the month. In this case, for example, the pinning determination unit 26 may release the pinned and displayed state in a case where the pinning period ends. This is an example of releasing the state of controlling to display the information related to the specific data at a predetermined position in a case where the specific period ends.

Further, in a case where the file is pinned by being used a predetermined number of times within the pinning period, the pinning determination unit 26 may not pin the file again in a case where the file has not been used within the period. For example, there is a case where the file has been used once at the end of the month for several months, so the file has been pinned at the end of the month, but at some point in time, the pinned file is no longer in use and will not be pinned from the end of the next month. This is an example of controlling not to display the information related to the specific data at a predetermined position in the period following the specific period among the periods that appear repeatedly, in a case where the number of times of use in the specific period is not equal to or more than the reference number of times.

Further, the pinning determination unit 26 may pin an important file in a case where the important file is stored in the HDD 14. As the important file, for example, the pinning determination unit 26 may pin the file sent by fax confidential reception in a case where the file is stored in the HDD 14.

Further, the pinning determination unit 26 may make determination as to whether or not to pin a file depending on the user who owns the box in which the file is stored, or make the same determination as to whether or not to pin the file for all users.

Further, the pinning determination unit 26 may change the determination as to whether or not to pin the file depending on what processing the file has been taken out for. For example, the pinning determination unit 26 may make determination as to whether or not to pin the file differently between a case where the file is taken out for printing and a case where the file is taken out for transmission to another apparatus.

Further, the pinning determination unit 26 may pin the file only in a case where an individual owns the box of the HDD 14 in which the file is stored. That is, in a case where a plurality of users share the box of the HDD 14 in which the file is stored, the file may not be pinned unless instructed by the user.

Further, the pinning determination unit 26 may determine whether or not to pin the file by combining an attribute of the file, the type of the image processing apparatus 10, and the like. For example, in a case where the box is shared with another image processing apparatus, in a case where a file that is often printed and has high image quality and many pages, and the image processing apparatus 10 is a high-class apparatus, the file may be pinned.

The pinning information storage unit 27 stores pinning information indicating whether to pin the file, that is, whether to fix and display the file at the top of the list. The details of this pinning information will be described later.

The display control unit 28 controls, in a case where the operation reception unit 21 receives a user operation requesting display of a list of the files stored in the box of the HDD 14, to display the file list on the operation panel 15. At that time, the display control unit 28 controls to display the file designated to be pinned with the pinning information stored in the pinning information storage unit 27 in the pinned state, that is, in the state of being fixed at the top of the list.

In addition, the display control unit 28 may control to display a message, an icon, or the like indicating that the file has been pinned by the usage history of the file satisfying a predetermined condition in association with the pinned file on the list. For example, the display control unit 28 may make the icon displayed for the pinned file by the usage history of the file satisfying a predetermined condition different from the icon displayed for the pinned file according to the user's instruction.

Further, in a case where a plurality of conditions are used for determining whether to pin a file, the display control unit 28 may set priority for the conditions and control the display according to the priority. For example, the display control unit 28 may make the icon displayed for the pinned file by the usage history of the file satisfying a certain condition different from the icon displayed for the pinned file, which is pinned because the usage history of the file satisfies another condition having a priority different from the condition.

Furthermore, the display control unit 28 may control to display a text string that shows the purpose of use of the file in association with the pinned file on the list.

In a case where the operation reception unit 21 receives a user operation for deleting a file stored in the box of the HDD 14, the file deletion unit 29 deletes the file. Alternatively, in a case where the operation reception unit 21 receives a user operation for deleting a box of the HDD 14, the file deletion unit 29 deletes the box. At that time, the file deletion unit 29 may refer to the pinning information stored in the pinning information storage unit 27, and limit the deletion of the file designated to be pinned and a box in which such file is stored. For example, in a case of deleting the file or the box, the file deletion unit 29 may display a warning screen notifying that the file or box is pinned and asking whether the file or box may be deleted as it is. Further, in a case where an administrator of the image processing apparatus 10 owns the box to be deleted, the file deletion unit 29 may display that the box may not be deleted and not delete the box. Further, in a case of determining whether to pin for each user, the file deletion unit 29 may allow only a user who has determined to pin, or only the user who has determined to pin and the administrator of the image processing apparatus 10 to delete. In the present exemplary embodiment, in a case where the deletion of specific data is requested, the processing of the file deletion unit 29 is performed as an example of prohibiting or limiting the deletion.

First Operation of Information Processing Apparatus

In the first operation, the setting information storage unit 25 stores the setting information including the reference number of times. As described above, the reference number of times is the number of times the file has been used within a predetermined period, which is required to pin the file. Here, the reference number of times is set to "9".

First, in a case where the user performs an operation of selecting a file from the box of the HDD 14, the operation reception unit 21 receives the operation.

Figure 3:
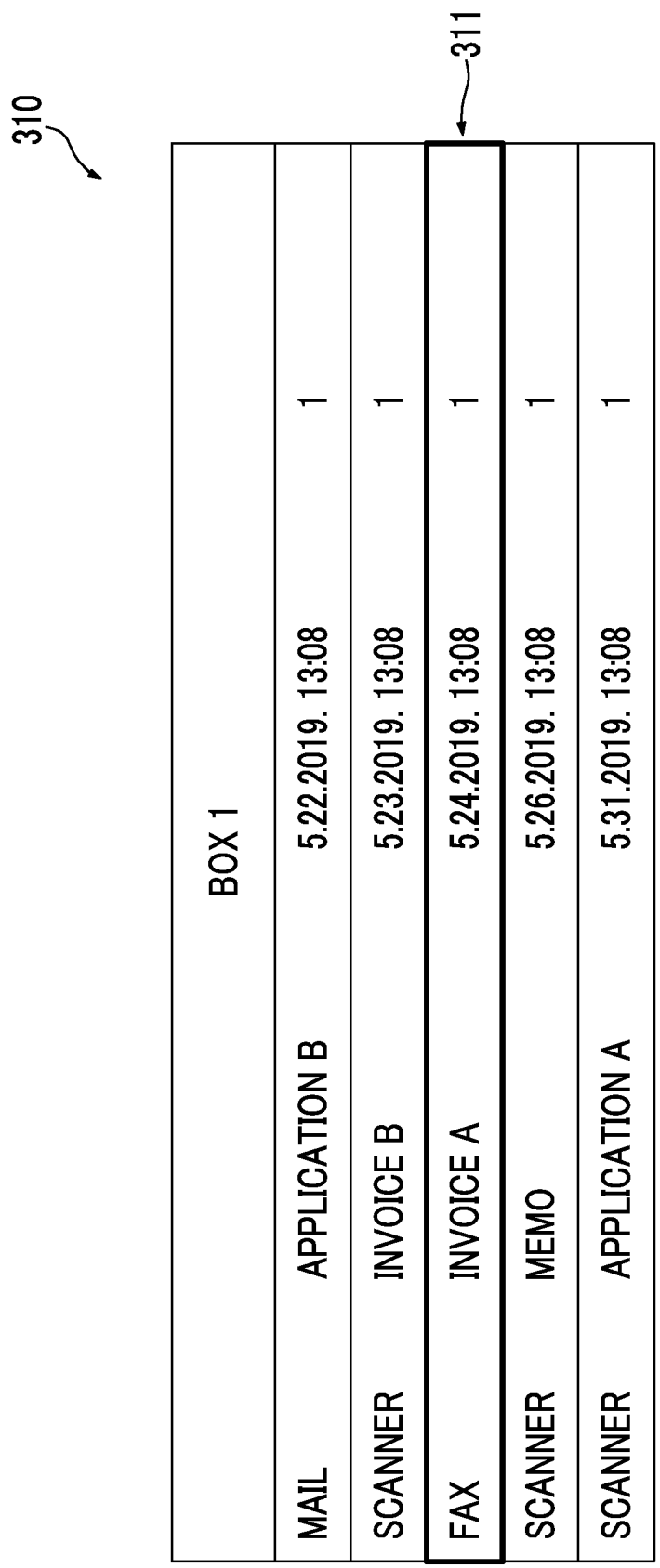
FIG. 3 is a diagram showing an example of a file selection screen for performing an operation of selecting a file in first to third operations of the information processing apparatus according to an exemplary embodiment of the present invention.

FIG. 3 is a diagram showing an example of a file selection screen 310 for performing an operation of selecting a file. Here, the file "Invoice A" on line 311 is selected, as shown in a thick frame.

As a result, the file take-out unit 22 takes out the selected file from the box of the HDD 14. Then, the file take-out unit 22 updates a usage history 410 stored in the usage history storage unit 23 by taking out the file from the box of the HDD 14.

FIG. 4 is a diagram showing an example of the usage history 410 after being updated as described above. As shown in the drawing, the usage history 410 is obtained by associating a file ID, a file name, the number of times of use, and the like. The file ID is identification information of the corresponding file, the file name is the name of the corresponding file, and the number of times of use is the number of times the corresponding file has been taken out within a predetermined period. Here, it is assumed that the number of times of use is "9" before the file "Invoice A" is taken out in FIG. 3. By taking out the file "Invoice A", "1" is added to the number of times of use, and the number of times of use is "10".

Next, the usage history acquisition unit 24 acquires the usage history of each file. Then, the usage history acquisition unit 24 delivers the usage history of each file to the pinning determination unit 26.

As a result, the pinning determination unit 26 compares the number of times of use in the usage history received from the usage history acquisition unit 24 with the reference number of times stored in the setting information storage unit 25 for each file. The pinning determination unit 26 determines whether to pin each file based on the comparison result, and updates pinning information 510 stored in the pinning information storage unit 27.

FIG. 5 is a diagram showing an example of the pinning information 510 after being updated as described above. As shown in the drawing, the pinning information 510 is obtained by associating a file ID, a file name, a pinning flag, and the like. As described above, the file ID is identification information of the corresponding file, and the file name is the name of the corresponding file. The pinning flag is a flag indicating that the corresponding file is pinned, and pinning is indicated by "ON" and non-pinning is indicated by "OFF". Here, the number of times of use corresponding to the file "Invoice A" is "10", which exceeds the reference number of times "9", so that the pinning flag corresponding to the file "Invoice A" is "ON".

Next, in a case where the user performs an operation requesting the display of the list of the files stored in the box of the HDD 14, the operation reception unit 21 receives the operation.

As a result, the display control unit 28 controls to display the list of the files stored in the box of the HDD 14 on the operation panel 15. At that time, the display control unit 28 refers to the pinning information stored in the pinning information storage unit 27, and pins the file for which the pinning flag is "ON". That is, the display control unit 28 controls to move the file for which the pinning flag is "ON" to the top of the list, display the file fixedly, and display an icon indicating that the file has been pinned.

Figure 6:
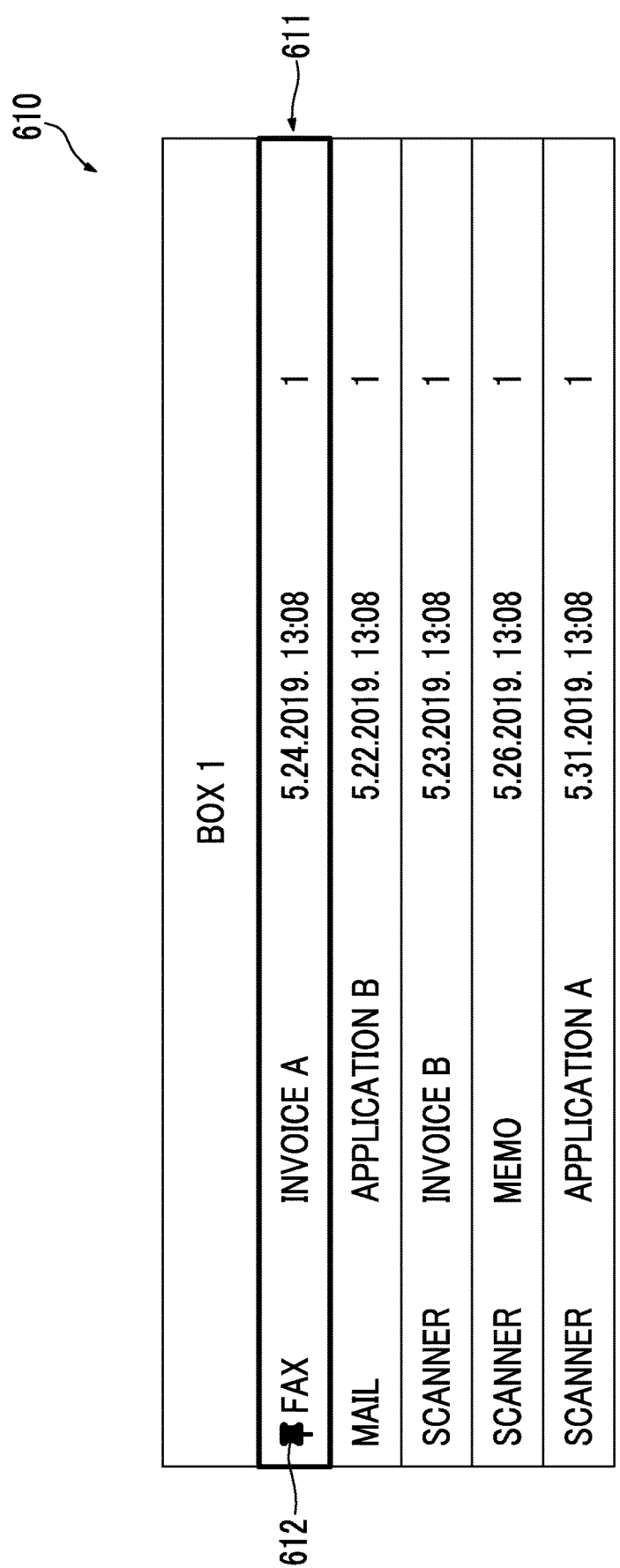
FIG. 6 is a diagram showing an example of a file list screen for displaying a file list in a first or second operation of the information processing apparatus according to an exemplary embodiment of the present invention.

FIG. 6 is a diagram showing an example of a file list screen 610 for displaying a list of files. Here, as shown in a thick frame, the file "Invoice A" on line 611 is displayed at the top of the list, and an icon 612 indicating that the file has been pinned is displayed.

Second Operation of Information Processing Apparatus

In the second operation, the setting information storage unit 25 stores the setting information including the pinning period, the reference number of times, and the number of reference periods. As described above, the pinning period is a period during which the file is pinned. The reference number of times is the number of times the file has been used within the pinning period, which is required to pin the file. The number of reference periods is the number of pinning periods, which is required to pin a file, in which the number of times the file has been used within the pinning period is equal to or more than the reference number of times. Here, it is assumed that the pinning period is set to the 25th to the 31st of each month, the reference number of times is "1", and the number of reference periods is "3".

First, in a case where the user performs an operation of selecting a file from the box of the HDD 14, the operation reception unit 21 receives the operation. Since the file selection screen for performing the file selection operation is the same as that shown in FIG. 3, the description thereof will be omitted.

As a result, the file take-out unit 22 takes out the selected file from the box of the HDD 14. Then, the file take-out unit 22 updates a usage history 420 stored in the usage history storage unit 23 by taking out the file from the box of the HDD 14.

FIG. 7 is a diagram showing an example of the usage history 420 after being updated as described above. As shown in the drawing, the usage history 420 is obtained by associating the date of use, a file ID, a file name, and the like. The date of use is the date when the corresponding file has been taken out, the file ID is identification information of the corresponding file, and the file name is the name of the corresponding file. Here, only the usage history of the file "Invoice A" taken out in FIG. 3 is shown. That is, although there is a possibility that the usage histories of the files "Application B", "Invoice B", "Memo", and "Application A" exist between the usage histories of the file "invoice A", these usage histories are not shown because the usage histories do not satisfy the conditions for pinning.

Next, the usage history acquisition unit 24 acquires the usage history of each file. Then, the usage history acquisition unit 24 delivers the usage history of each file to the pinning determination unit 26.

As a result, the pinning determination unit 26 compares the number of pinning periods in which the date of use received from the usage history acquisition unit 24 includes the usage history within the pinning period among the pinning periods stored in the setting information storage unit 25 with the number of reference periods stored in the setting information storage unit 25 for each file. The pinning determination unit 26 determines whether to pin each file based on the comparison result, and updates pinning information 520 stored in the pinning information storage unit 27.

FIG. 8 is a diagram showing an example of the pinning information 520 after being updated as described above. As shown in the drawing, the pinning information 520 is obtained by associating a file ID, a file name, a pinning flag, a pinning date, a temporary release flag, and the like. As described above, the file ID is identification information of the corresponding file, and the file name is the name of the corresponding file. The pinning flag is a flag indicating that the corresponding file is pinned, and pinning is indicated by "ON" and non-pinning is indicated by "OFF". The pinning date is the date when the pinning flag is "ON" in a case where the pinning flag is "ON". The temporary release flag is a flag indicating that the corresponding file is supposed to be pinned but the pinning is temporarily released, and indicates that the pinning is temporarily released by "ON" and indicates that the pinning is not temporarily released by "OFF". Here, among the periods from the 25th to the 31st of each month, since the number of periods during which the file "Invoice A" is taken out one or more times is "4", and the number of reference periods exceeds "3", the pinning flag corresponding to the file "Invoice A" is set to "ON".

Here, the operation of the pinning determination unit 26 in a case of determining whether or not to pin the file by the usage history of one file being delivered from the usage history acquisition unit 24 will be described.

Figure 9:
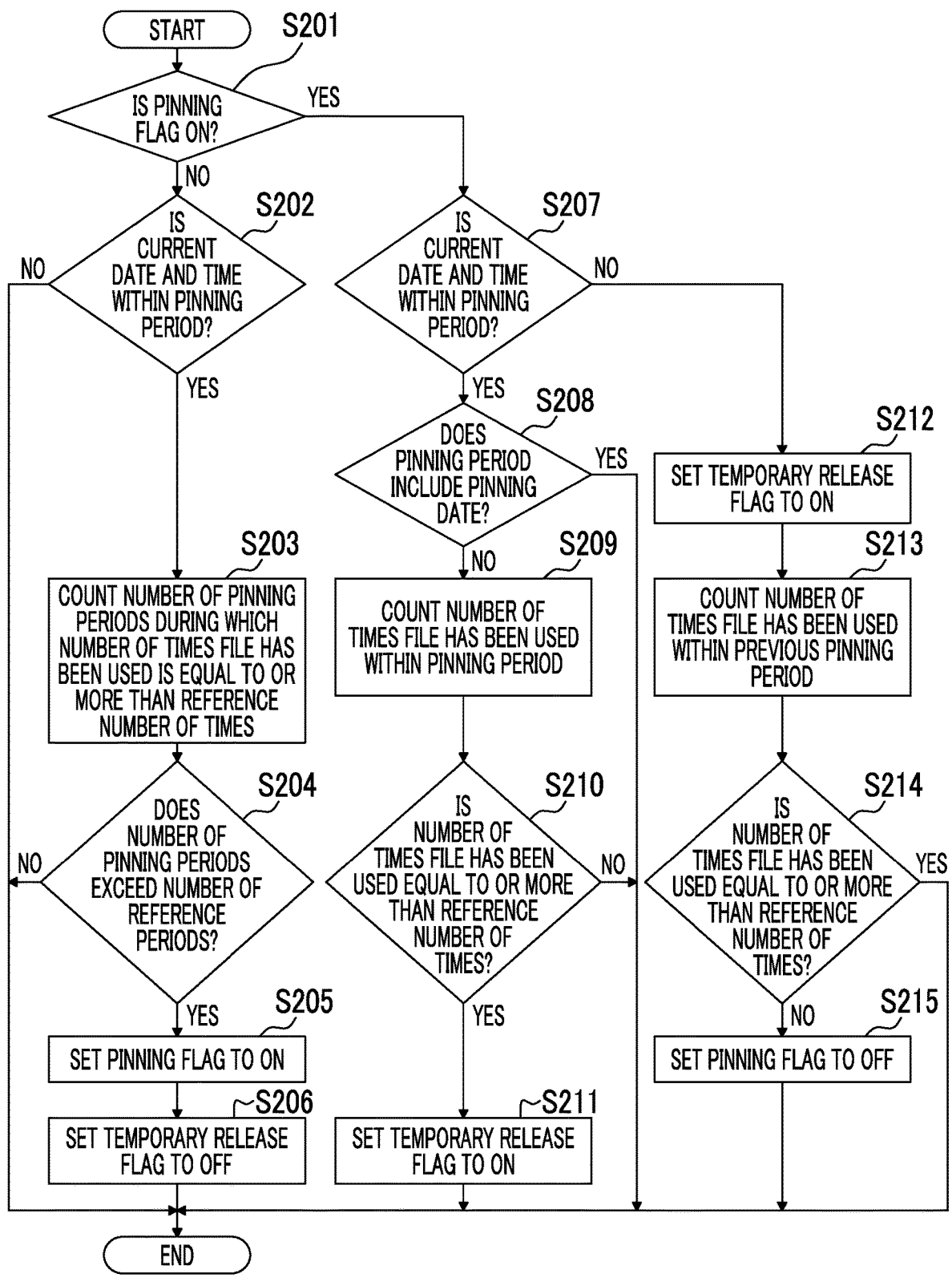
FIG. 9 is a flowchart showing an operation example of a pinning determination unit in a second operation of the information processing apparatus according to an exemplary embodiment of the present invention.

FIG. 9 is a flowchart showing an operation example of the pinning determination unit 26 at the time. It is assumed that the operation is executed by the usage history of the file being periodically delivered from the usage history acquisition unit 24. Further, in the following, the file of which usage history has been delivered from the usage history acquisition unit 24 will be referred to as a "target file".

As shown in the drawing, the pinning determination unit 26 first refers to the pinning information stored in the pinning information storage unit 27 to determine whether or not the pinning flag corresponding to the target file is "ON" (step S201).

First, a case where it is not determined in step S201 that the pinning flag corresponding to the target file is "ON", that is, a case where it is determined that the pinning flag is "OFF" will be described.

In this case, the pinning determination unit 26 determines whether or not the current date and time is within the pinning period stored in the setting information storage unit 25 (step S202).

In a case where it is determined in step S202 that the current date and time is within the pinning period, the pinning determination unit 26 counts the number of pinning periods during which the number of times the target file has been used is equal to or more than the reference number of times (step S203). Here, for example, the number of times the target file has been used may be acquired from the usage history of the target file delivered from the usage history acquisition unit 24. Further, for example, the pinning period may be acquired from the setting information stored in the setting information storage unit 25. Then, the pinning determination unit 26 determines whether or not the number of pinning periods counted in step S203 exceeds the number of reference periods stored in the setting information storage unit 25 (step S204).

In a case where it is determined in step S204 that the number of pinning periods exceeds the number of reference periods, the pinning determination unit 26 sets the pinning flag to "ON" (step S205) and the temporary release flag to "OFF" (step S206) in the pinning information of the target file stored in the pinning information storage unit 27, and ends the processing.

On the other hand, in a case where it is not determined in step S202 that the current date and time is within the pinning period, or in a case where it is not determined in step S204 that the number of pinning periods exceeds the number of reference periods, the pinning determination unit 26 ends the processing without setting the pinning flag corresponding to the target file to "ON".

Next, a case where it is determined in step S201 that the pinning flag corresponding to the target file is "ON" will be described.

In this case, the pinning determination unit 26 determines whether or not the current date and time is within the pinning period stored in the setting information storage unit 25 (step S207).

In a case where it is determined in step S207 that the current date and time is within the pinning period, the pinning determination unit 26 determines whether the pinning period includes the pinning date (step S208). Here, for example, the pinning date may be acquired from the pinning information stored in the pinning information storage unit 27.

In a case where it is determined in step S208 that the pinning period includes the pinning date, the pinning determination unit 26 ends the processing. This is because, in the pinning period during which pinning is performed, for example, it is preferable to pin the file until the end of the pinning period.

In a case where it is not determined in step S208 that the pinning period includes the pinning date, the pinning determination unit 26 counts the number of times the target file has been used within the pinning period (step S209). Here, for example, the number of times the target file has been used may be acquired from the usage history of the target file delivered from the usage history acquisition unit 24. Then, the pinning determination unit 26 determines whether or not the number of times the target file has been used counted in step S209 is equal to or more than the reference number of times stored in the setting information storage unit 25 (step S210).

In a case where it is determined in step S210 that the number of times the target file has been used is equal to or more than the reference number of times, the pinning determination unit 26 sets the temporary release flag to "ON" in the pinning information of the target file stored in the pinning information storage unit 27 (step S211), and ends the processing.

In a case where it is not determined in step S210 that the number of times the target file has been used is equal to or more than the reference number of times, the pinning determination unit 26 ends the processing without setting the temporary release flag to "ON".

On the other hand, in a case where it is not determined in step S207 that the current date and time is within the pinning period, the pinning determination unit 26 sets the temporary release flag to "ON" in the pinning information of the target file stored in the pinning information storage unit 27 (step S212). In addition, the pinning determination unit 26 counts the number of times the target file has been used within the previous pinning period (step S213). Here, for example, the previous number of times the target file has been used may be acquired from the usage history of the target file delivered from the usage history acquisition unit 24. Then, the pinning determination unit 26 determines whether or not the number of times the target file has been used counted in step S213 is equal to or more than the reference number of times stored in the setting information storage unit 25 (step S214).

In a case where it is not determined in step S214 that the number of times the target file has been used is equal to or more than the reference number of times, the pinning determination unit 26 sets the pinning flag to "OFF" in the pinning information of the target file stored in the pinning information storage unit 27 (step S215), and ends the processing.

In a case where it is determined in step S214 that the number of times the target file has been used is equal to or more than the reference number of times, the pinning determination unit 26 ends the processing without setting the pinning flag to "OFF".

After that, in a case where the user performs an operation requesting the display of the list of the files stored in the box of the HDD 14, the operation reception unit 21 receives the operation.

As a result, the display control unit 28 controls to display the list of the files stored in the box of the HDD 14 on the operation panel 15. At that time, the display control unit 28 refers to the pinning information stored in the pinning information storage unit 27, and pins the file for which the pinning flag is "ON". That is, the display control unit 28 controls to move the file for which the pinning flag is "ON" to the top of the list, display the file fixedly, and display an icon indicating that the file has been pinned. Since the file list screen for displaying the file list is the same as that shown in FIG. 6, the description thereof will be omitted.

Third Operation of Information Processing Apparatus

In the second operation, whether or not to pin a file is determined for each file, but in the third operation, whether or not to pin a file is determined for each file type. The file type may be determined by scanning the content of a form with an image scanning apparatus or the like, for example. Also in the third operation, the setting information storage unit 25 stores the setting information including the pinning period, the reference number of times, and the number of reference periods. The pinning period is the same as in the second operation. On the other hand, the reference number of times and the number of reference periods are different from the reference number of times and the number of reference periods in the second operation. The reference number of times is the number of times the file type of the file has been used within the pinning period, which is required to pin the file. The number of reference periods is the number of pinning periods, which is required to pin a file, in which the number of times the file type of the file has been used within the pinning period is equal to or more than the reference number of times. Here, it is assumed that the pinning period is the 25th to the 31st of each month, the reference number of times is "2", and the number of reference periods is "3".

First, in a case where the user performs an operation of selecting a file from the box of the HDD 14, the operation reception unit 21 receives the operation. Since the file selection screen for performing the file selection operation is the same as that shown in FIG. 3, the description thereof will be omitted.

As a result, the file take-out unit 22 takes out the selected file from the box of the HDD 14. Then, the file take-out unit 22 updates a usage history 430 stored in the usage history storage unit 23 by taking out the file from the box of the HDD 14.

FIG. 10 is a diagram showing an example of the usage history 430 after being updated as described above. As shown in the drawing, the usage history 430 is obtained by associating the date of use, a file ID, a file name, a file type ID, and the like. The date of use is the date when the corresponding file has been taken out, the file ID is identification information of the corresponding file, the file name is the name of the corresponding file, and the file type ID is identification information of the corresponding file type.

Here, only the usage histories of the file "Invoice A" taken out in FIG. 3 and the file "Invoice B" which is the same invoice are shown. That is, although there is a possibility that the usage histories of the files "Application B", "Memo", and "Application A" exist between the usage histories of the file "Invoice A" and the file "Invoice B", these usage histories are not shown because the usage histories do not satisfy the conditions for pinning.

Next, the usage history acquisition unit 24 acquires the usage history of each file type. Then, the usage history acquisition unit 24 delivers the usage history of each file type to the pinning determination unit 26.

As a result, the pinning determination unit 26 compares the number of pinning periods of which the date of use received from the usage history acquisition unit 24 includes two or more usage histories within the pinning period among the pinning periods stored in the setting information storage unit 25 with the number of reference periods stored in the setting information storage unit 25 for each file type. The pinning determination unit 26 determines whether to pin the file of each file type based on the comparison result, and updates pinning information 530 stored in the pinning information storage unit 27.

FIG. 11 is a diagram showing an example of the pinning information 530 after being updated as described above. As shown in the drawing, the pinning information 530 is obtained by associating a file ID, a file name, a file type ID, a pinning flag, a pinning date, a temporary release flag, and the like. As described above, the file ID is identification information of the corresponding file, the file name is the name of the corresponding file, and the file type ID is identification information of the corresponding file type. The pinning flag is a flag indicating that the corresponding file is pinned, and pinning is indicated by "ON" and non-pinning is indicated by "OFF". The pinning date is the date when the pinning flag is "ON" in a case where the pinning flag is "ON". The temporary release flag is a flag indicating that the corresponding file is supposed to be pinned but the pinning is temporarily released, and indicates that the pinning is temporarily released by "ON" and indicates that the pinning is not temporarily released by "OFF". Here, among the periods from the 25th to the 31st of each month, since the number of periods during which a file of which file type is invoice has been taken out twice or more is "4" which exceeds the number of reference periods "3", the pinning flag corresponding to the file of which the file type is invoice is "ON".

Here, the operation of the pinning determination unit 26 in a case of determining whether to pin a file of this file type by the usage history of one file type being delivered from the usage history acquisition unit 24 is basically the same as the operation of the flowchart shown in FIG. 9. That is, in the second operation, the operation of the flowchart of FIG. 9 has been performed for one file, but in the example of the third operation, the operation of the flowchart shown in FIG. 9 may be performed for each of a plurality of files of one file type.

After that, in a case where the user performs an operation requesting the display of the list of the files stored in the box of the HDD 14, the operation reception unit 21 receives the operation.

As a result, the display control unit 28 controls to display the list of the files stored in the box of the HDD 14 on the operation panel 15. At that time, the display control unit 28 refers to the pinning information stored in the pinning information storage unit 27, and pins the file for which the pinning flag is "ON". That is, the display control unit 28 controls to move the file for which the pinning flag is "ON" to the top of the list, display the file fixedly, and display an icon indicating that the file has been pinned.

Figure 12:
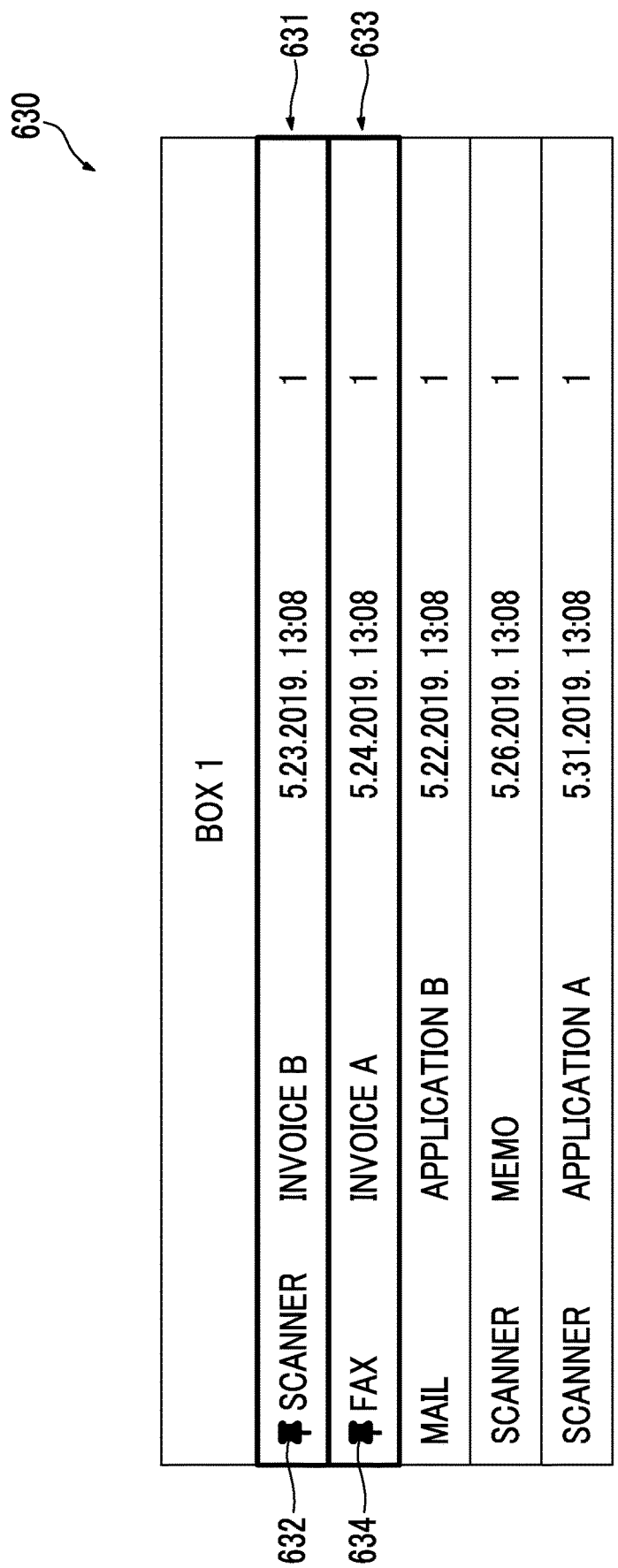
FIG. 12 is a diagram showing an example of a file list screen for displaying a file list in a third operation of the information processing apparatus according to an exemplary embodiment of the present invention.

FIG. 12 is a diagram showing an example of a file list screen 630 that displays a list of files. Here, as shown in a thick frame, the file "Invoice B" on line 631 and the file "Invoice A" on line 633 are displayed at the top of the list, and icons 632 and 634 indicating that the files have been pinned are displayed. The file list screen 630 may be displayed in a case where the user logs in within the pinning period.

Processor

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Program

The processing performed by the information processing apparatus 20 in the present exemplary embodiment is prepared as, for example, a program such as application software.

That is, the program that realizes the present exemplary embodiment may be regarded as a program for causing a computer to realize a function of grasping usage histories of a plurality of pieces of data stored in a storage apparatus, and a function of controlling, in a case of initially displaying information related to the plurality of pieces of data on a screen, to display information related to specific data of which a usage history satisfies a predetermined condition at a predetermined position on the screen.

Note that the program that realizes the present exemplary embodiment may be provided not only by communication means but also by storing the program in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a storage apparatus; and
a processor coupled to the storage apparatus and configured to:
grasp usage histories of a plurality of files stored in the storage apparatus;
in a case of initially displaying information related to the plurality of files on a screen by displaying the plurality of files in a file list, perform a control to display information related to a first file of the plurality of files of which the usage history satisfies a predetermined condition being pinned to a beginning of the file list ahead of all other files of the plurality of files not satisfying the predetermined condition, wherein the predetermined condition is a first number of times of use recorded in the usage history in a first predetermined period exceeding a reference number of times;

the first file being pinned to the beginning of the file list comprising: the first file being fixed to the beginning of the file list while the other files of the plurality of files not having satisfied the predetermined condition is not fixed to any specific location of the file list, and in a case of arranging the plurality of files during a second predetermined period based on a predetermined criteria, arrange all of the plurality of files based on the predetermined criteria except for the first file which is fixed to the beginning of the file list, and after the first file is pinned to the beginning of the file list, remove the first file from being pinned to any location of the file list in response to a second number of times of use recorded in the usage history in the second predetermined period not exceeding the reference number of times, wherein the second predetermined period in the usage history is a same consecutive days of a month that appear repeatedly from month to month and remove the first file from being pinned to any location of the file list in response to the second number of times of use recorded in the usage history in the second predetermined period not exceeding the reference number of times comprising:

remove the first file from being pinned to any location of the file list in response to a number of occurrences of the second predetermined period, during which the second number of times of use recorded in the usage history not exceeding the reference number of times, exceeding a number of reference periods.

2. The information processing apparatus according to claim 1, wherein the processor is configured to:

in a case where the number of occurrences of the second predetermined period, during which the second number of times of use recorded in the usage history has exceeded the reference number of times, exceeding a number of reference periods, perform control to display information related to the first file at the beginning of the file list during the second predetermined period.

3. The information processing apparatus according to claim 2, wherein the processor is configured to:

in a case where the number of occurrences of the second predetermined period, during which the second number of times of use recorded in the usage history has exceeded the reference number of times, exceeding a number of reference periods, release a state of performing control to display the information related to the first file at the beginning of the file list during the second predetermined period.

4. The information processing apparatus according to claim 2, wherein the processor is configured to:

in a case where the second predetermined period ends, release a state of performing control to display the information related to the first file at the beginning of the file list.

5. The information processing apparatus according to claim 2, wherein the processor is configured to:

in a case where the number of occurrences of the second predetermined period, during which the second number of times of use recorded in the usage history not exceeding the reference number of times, exceeding a number of reference periods, perform control not to display the information related to the first file at the beginning of the file list during the second predetermined period.

6. The information processing apparatus according to claim 1, wherein the processor is configured to:

grasp the usage histories for each type of the plurality of files, and in a case of initially displaying information related to the plurality of files on the screen, perform control to display information related to a second file of a specific type of which the usage history satisfies a predetermined condition at the beginning of the file list on the screen.

7. The information processing apparatus according to claim 6, wherein the usage history is the number of times of use in each of periods that appear repeatedly, and the predetermined condition is a condition that the number of periods during which the number of times of use is equal to or more than the reference number of times among the periods that appear repeatedly exceeds the number of reference periods.

8. The information processing apparatus according to claim 7, wherein the processor is configured to: in a case where the number of periods during which the number of times of use is equal to or more than the reference number of times among the periods that appear repeatedly exceeds the number of reference periods, perform control to display the information related to the second file of the specific type at the beginning of the file list in a specific period among the periods that appear repeatedly.

9. The information processing apparatus according to claim 1, wherein the processor is configured to:

in a case where deletion of the first file is requested, prohibit or limit the deletion of the first file.

10. The information process apparatus of claim 1, wherein the predetermined criteria is one or more of a file name, a file size, and a date and time of creation of a file of the plurality of files.

11. The information processing apparatus according to claim 6, wherein the first file is associated with a first pinning flag, a second file is associated with a second pinning flag, the first pining flag is displayed in a case where the first file is pinned, and the second pinning flag is displayed in a case where the second file is pinned.

12. The information processing apparatus according to claim 11, wherein the first file is further associated with a first temporary release flag, the second file is associated with a second temporary release flag, and in a case where first pinning flag of the second file is on and the second temporary release flag is on, the second file is not pinned to the top of the file list.

13. A non-transitory computer readable medium storing a program causing a computer to realize:

grasping usage histories of a plurality of files stored in the storage apparatus;

in a case of initially displaying information related to the plurality of files on a screen by displaying the plurality of files in a file list, performing a control to display information related to a first file of the plurality of files of which the usage history satisfies a predetermined condition being pinned to a beginning of the file list ahead of all other files of the plurality of files not satisfying the predetermined condition, wherein the predetermined condition is a first number of times of use recorded in the usage history in a first predetermined period exceeding a reference number of times;

the first file being pinned to the beginning of the file list comprising: the first file being fixed to the beginning of the file list while the other files of the plurality of files not having satisfied the predetermined condition is not fixed to any specific location of the file list, and in a case of arranging the plurality of files during a second predetermined period based on a predetermined criteria, arrange all of the plurality of files based on the predetermined criteria except for the first file which is fixed to the beginning of the file list, and after the first file is pinned to the beginning of the file list, remove the first file from being pinned to any location of the file list in response to a second number of times of use recorded in the usage history in a second predetermined period not exceeding the reference number of times, wherein the second predetermined period in the usage history is a same consecutive days of a month that appear repeatedly from month to month and remove the first file from being pinned to any location of the file list in response to the second number of times of use recorded in the usage history in the second predetermined period not exceeding the reference number of times comprising:

remove the first file from being pinned to any location of the file list in response to a number of occurrences of the second predetermined period, during which the second number of times of use recorded in the usage history not exceeding the reference number of times, exceeding a number of reference periods.

14. An information processing method comprising:

grasping usage histories of a plurality of files stored in the storage apparatus;

in a case of initially displaying information related to the plurality of files on a screen by displaying the plurality of files in a file list, performing a control to display information related to a first file of the plurality of files of which the usage history satisfies a predetermined condition being pinned to a beginning of the file list ahead of all other files of the plurality of files not satisfying the predetermined condition, wherein the predetermined condition is a first number of times of use recorded in the usage history in a first predetermined period exceeding a reference number of times;

the first file being pinned to the beginning of the file list comprising: the first file being fixed to the beginning of the file list while the other files of the plurality of files not having satisfied the predetermined condition is not fixed to any specific location of the file list, and in a case of arranging the plurality of files during a second predetermined period based on a predetermined criteria, arrange all of the plurality of files based on the predetermined criteria except for the first file which is fixed to the beginning of the file list, and after the first file is pinned to the beginning of the file list, removing the first file from being pinned to any location of the file list in response to a second number of times of use recorded in the usage history in a second predetermined period not exceeding the reference number of times, wherein the second predetermined period in the usage history is a same consecutive days of a month that appear repeatedly from month to month and remove the first file from being pinned to any location of the file list in response to the second number of times of use recorded in the usage history in the second predetermined period not exceeding the reference number of times comprising:

remove the first file from being pinned to any location of the file list in response to a number of occurrences of the second predetermined period, during which the second number of times of use recorded in the usage history not exceeding the reference number of times, exceeding a number of reference periods.

* * * * *